United States Patent [19] [11] Patent Number: 4,667,107
Wang [45] Date of Patent: May 19, 1987

[54] ULTRAFAST NEUTRON DETECTOR

[75] Inventor: Ching L. Wang, Livermore, Calif.

[73] Assignee: The United States of America as represented by the United States Department of Energy, Washington, D.C.

[21] Appl. No.: 746,496

[22] Filed: Jun. 19, 1985

[51] Int. Cl.$^4$ .................................................. G01T 3/00
[52] U.S. Cl. ..................................... 250/390; 250/392; 250/472.1; 250/475.2; 376/154
[58] Field of Search ............... 250/390 K, 390 R, 391, 250/392, 472.1, 473.1, 475.2, 483.1; 376/254, 255, 153, 154, 155

[56] References Cited

U.S. PATENT DOCUMENTS

| | | | |
|---|---|---|---|
| 3,076,895 | 2/1963 | Baldwin | 376/154 |
| 3,688,117 | 8/1972 | Givens | 376/166 |
| 3,891,852 | 6/1975 | Bollen et al. | 250/391 |
| 4,365,159 | 12/1982 | Young | 250/385 |
| 4,381,454 | 4/1983 | Griffith et al. | 250/472.1 |
| 4,404,470 | 9/1983 | Wang | 250/390 |

OTHER PUBLICATIONS

A. Piotrowska, A. Guivarch and G. Pelous, "Ohmic Contacts to III-V Compound Semiconductors: A Review of Fabrication Techniques" *Solid State Electronics*, vol. 26, (1983), pp. 179-197.
R. H. Price, J. D. Wiedwald, J. R. Kalibjian, S. W. Thomas and W. M. Cook, "Design of Ultrafast Gated Intensifier for Laser Fusion X-ray Framing Applications" 1983 *Laser Program Annual Report*, Lawrence Livermore National Laboratory UCRL-50021-83, (Aug. 7, 1984), pp. 5/12-5/18 and 5/60.
C. L. Wang, R. Kalibjian, M. S. Singh, J. D. Wiedwald, D. E. Campbell, M. D. Cable, W. R. Graves, S. M. Lane, R. A. Lerche, D. G. Stearns, G. A. Mourou and S. G. Prussin, "Approaches to Ultrafast Neutron Detectors" Preprint, Lawrence Livermore National Laboratory UCRL-91317, (Oct. 5, 1984).
C. L. Wang, R. Kalibjian, M. S. Singh, J. D. Wiedwald, D. E. Campbell, E. M. Campbell, M. D. Cable, W. R. Graves, S. M. Lane, R. A. Lerche, R. H. Price, D. G. Stearns, G. A. Mourou and S. G. Prussin, "Approaches to Ultrafast Neutron Detectors" *Review of Scientific Instruments*, vol. 56, No. 5, (May 1985), pp. 1096-1097.
D. H. Auston, "Picosecond Optoelectronic Switching and Gating in Silicon" *Applied Physics Letters*, vol. 26, No. 3, (Feb. 1, 1975), pp. 101-103.
P. Lefur and D. H. Auston, "A Kilovolt Picosecond Optoelectronic Switch and Pockel's Cell" *Applied Physics Letters*, vol. 28, No. 1, (Jan. 1, 1976), pp. 21-23.
G. Mourou and W. Knox, "High-Power Switching with Picosecond Precision" *Applied Physics Letters*, vol. 35, No. 7, (Oct. 1, 1979), pp. 492-495.
M. Ogawa, "Alloying Behavior of Ni/Au-Ge films on GaAs" *Journal of Applied Physics*, vol. 51, No. 1, (Jan. 1980), pp. 406-412.
R. H. Price, J. D. Wiedwald, R. Kalibjian, S. W. Thomas and W. M. Cook, "Ultrafast Gated Intensifier Design for Laser Fusion X-ray Framing Applications" *IEEE Transactions on Nuclear Science*, vol. NS-31, No. 1, (Feb. 1984), pp. 504-508.

*Primary Examiner*—Janice A. Howell
*Assistant Examiner*—Constantine Hannaher
*Attorney, Agent, or Firm*—Gary C. Roth; Clifton E. Clouse, Jr.; Judson R. Hightower

[57] ABSTRACT

The invention comprises a neutron detector (50) of very high temporal resolution that is particularly well suited for measuring the fusion reaction neutrons produced by laser-driven inertial confinement fusion targets. The detector comprises a biased two-conductor traveling-wave transmission line (54, 56, 58, 68) having a uranium cathode (60) and a phosphor anode (62) as respective parts of the two conductors. A charge line and Auston switch assembly (70, 72, 74) launch an electric field pulse along the transmission line. Neutrons striking the uranium cathode at a location where the field pulse is passing, are enabled to strike the phosphor anode and produce light that is recorded on photographic film (64). The transmission line may be variously configured to achieve specific experimental goals.

2 Claims, 6 Drawing Figures $$\alpha = \sin^{-1} v/c$$

ULTRAFAST NEUTRON DETECTOR

The U.S. Government has rights in this invention pursuant to Contract No. W-7405-ENG-48 between the U.S. Department of Energy and the University of California for the operation of the Lawrence Livermore National Laboratory.

BACKGROUND OF THE INVENTION

The invention described herein relates generally to neutron detectors, and more particularly to neutron detectors of very high temporal resolution.

The time-dependent distributions of the neutrons produced by various fusion reactions, such as those utilized in inertial confinement fusion targets driven by lasers such as the Nova laser of the Lawrence Livermore National Laboratory, are very difficult to accurately measure because in many instances the fusion reactions persist for times no longer than about 50 to 100 picoseconds. The detectors conventionally used to measure neutrons are not fast enough to record temporal variations in neutron flux with the requisite time-resolution for these applications.

Wang in U.S. Pat. No. 4,404,470 issued Sept. 13, 1983 discloses a neutron streak camera having a cathode of neutron-sensitive material such as uranium dioxide which provides secondary electrons upon receipt of neutron flux from a point source. The cathode is curved so that the differences in arrival times of the neutrons at the cathode are compensated for by the slower particle speeds of the secondary electrons.

Griffith et al in U.S. Pat. No. 4,381,454 issued Apr. 26, 1983 disclose a neutron dosimeter comprising a radiator layer containing material such as $^6$Li and $^{10}$B which, when subjected to moderate energy neutrons, produces alpha particles that produce tracks in an adjacent detecting sheet comprised of a material such as carbonate plastic.

Young in U.S. Pat. No. 4,365,159 issued Dec. 21, 1982 discloses a neutron detector comprising a lithium-6 foil which, when subjected to neutrons, emits or radiates charged particles that cause selective reactions in a gas mixture comprised of a counting gas which is readily ionized when charged particles pass through it. Monitoring equipment in contact with the gas mixture detects reactions taking place therein.

Bollen et al in U.S. Pat. No. 3,891,852 issued June 24, 1975 disclose irradiating an intensifying screen with neutrons and subjecting the resulting light pattern onto a photographic material. The screen incorporates a phosphor compound in which gadolinium is the host metal, and at least one other rare earth metal is present as a fluorescence activating metal.

Givens in U.S. Pat. No. 3,688,117 issued Aug. 29, 1972 teaches a borehole tool for obtaining a quantitative measure of the concentration of uranium in rock formations. The tool includes an accelerator-type neutron source which is periodically pulsed for the production of bursts of fast neutrons spaced in time. A thermal neutron detector is employed to detect neutrons resulting from the neutron fission of uranium. A second detector detects delayed radiation, such as beta rays, emitted from a known element when irradiated with neutrons from the accelerator-type neutron source. The recorded output of the second detector offers a representation of the quantity of neutrons produced by the accelerator-type neutron source. The neutron bursts produced by the accelerator-type neutron source have a time duration on the order of a few microseconds or less.

SUMMARY OF THE INVENTION

It is therefore an object of the invention to provide a neutron detector.

Another object of the invention is to provide a neutron detector of very high temporal resolution, such as may be used to measure distributions of neutrons produced by fusion reactions that persist for times as short as about 50 picoseconds.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the neutron detector of this invention may comprise a two-conductor traveling-wave transmission line having a uranium cathode as a part of its first conductor, and a phosphor anode as a part of its second conductor. The uranium cathode and the phosphor anode are adjacent to one another. Means are provided for launching an electric field pulse along the transmission line. Preferably such means comprise a charge line and Auston switch assembly. When neutrons from a source strike the uranium cathode at the same time that the electric field pulse is passing by, the electrons that are ejected from the cathode by the fission process are caused and enabled by the electric field to strike the phosphor anode and produce light. Without the electric field pulse, the fission electrons do not have sufficient energy to overcome a small bias voltage and pass over between the cathode and the anode. The light emitted from the phosphor anode is recorded, preferably by photographic film that backs the phosphor anode.

Especially for use with point neutron sources, the transmission line generally along its active portion containing the uranium cathode and the phosphor anode may be variously configured to achieve specific experimental goals. Particularly, the transmission line may be circularly curved and positioned to be approximately everywhere equidistant from the source, so that monoenergetic neutrons leaving the source at different times will be measured at different locations along the transmission line. Alternately, the transmission line may be configured as part of a logarithmic, or equiangular, spiral and positioned with respect to the source so that only those monoenergetic neutrons leaving the source at a single time will be measured at all locations along the transmission line. In this configuration the logarithmic spiral at every point intersects with the circumference of a circle centered at the source at a limiting angle equal to the arc sine of the quotient of the velocity of light divided by the velocity of the neutrons being measured.

The benefits and advantages of the present invention, as embodied and broadly described herein, include, inter alia, the provision of a neutron detector of very high temporal resolution, that may be used to measure distributions of neutrons produced by fusion reactions that persist for times as short as about 50 picoseconds.

BRIEF DESCRIPTION OF THE DRAWINGS

The accompanying drawings, which are incorporated and form a part of the specification, illustrate an embodiment of the invention and, together with the description, serve to explain the principles of the invention. In the drawings.

DETAILED DESCRIPTION OF THE INVENTION

Figure 1:
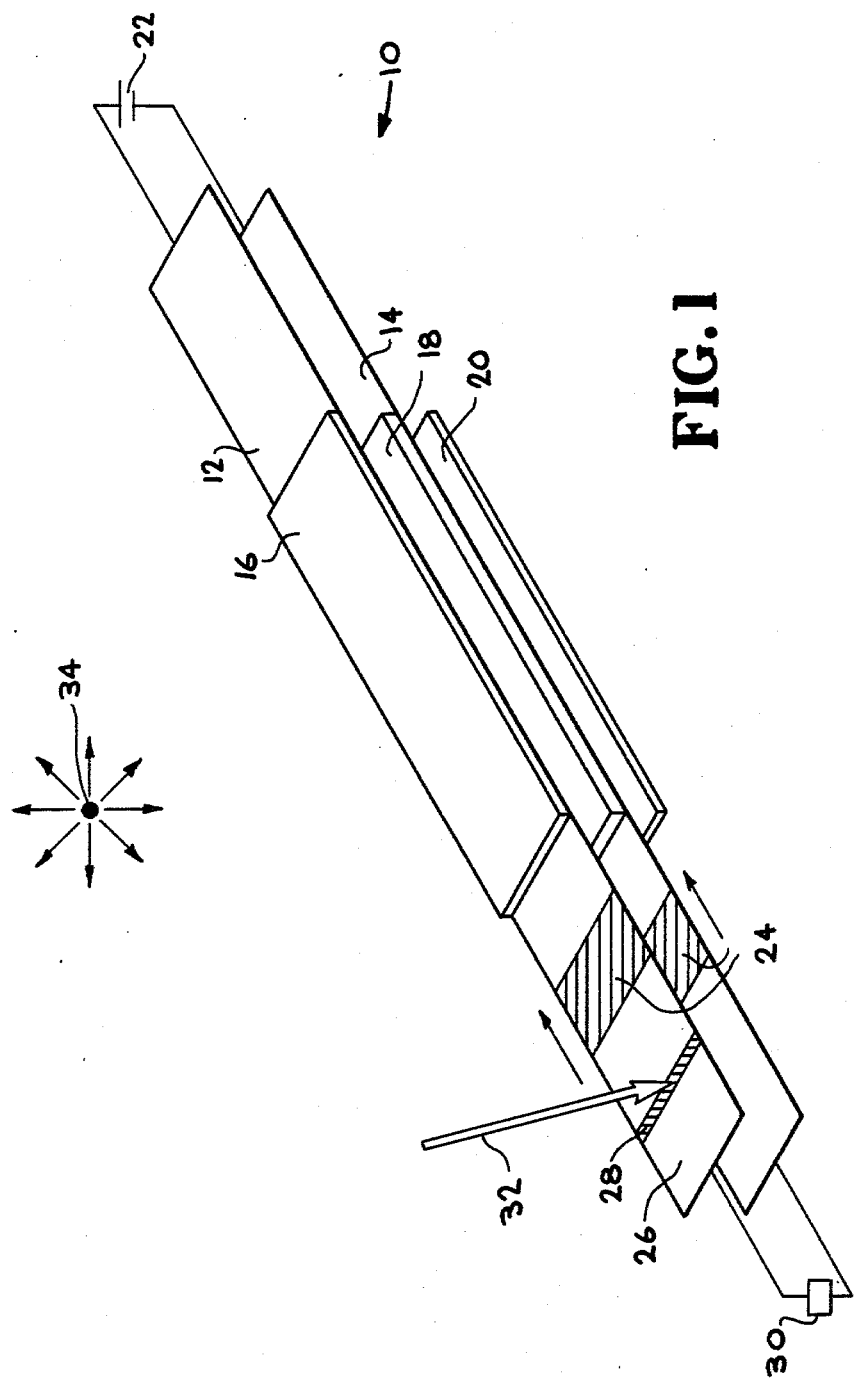
FIG. 1 is a schematic perspective view of the transmission line portion of a neutron detector made in accordance with the invention.

Reference will now be made in detail to the present preferred embodiment of the invention, an example of which is illustrated in the accompanying drawings. Reference is first made to FIG. 1 which shows a schematic perspective view of the transmission line portion of a neutron detector made in accordance with the invention. A two-conductor traveling-wave transmission line 10 has a first conductor 12 and a second conductor 14. A uranium cathode 16 and a phosphor anode 18 form parts of transmission line 10. Uranium cathode 16 is in the form of a uranium coating approximately 10 microns thick deposited onto first conductor 10, although in other embodiments of the invention cathode 16 may be formed of other fissionable materials, may comprise a foil as well as a coating, and may have any other appropriate thickness. In the preferred embodiment of the invention, uranium cathode 16 is approximately 5 cm long, and conductors 12 and 14 of transmission line 10, as well as cathode 16, are each approximately 6 mm wide. Phosphor anode 18 forms part of second conductor 14, and is adjacently positioned with respect to uranium cathode 16. Phosphor anode 18 is comprised of an approximately 10 micron thick layer of zinc silicate, $Zn_2SiO_4:Mn$, deposited on a 3 mm thick fiber-optic faceplate which efficiently couples photons away from the zinc silicate while minimizing photon scattering. Fiber-optic faceplates are standard components of many electronic devices, such as multistage image tubes, and have been very well known for many years. Uranium cathode 16 and phosphor anode 18 are integrated into conductors 12 and 14 so as to be nondisruptive with respect to the electrical characteristics of transmission line 10. A photographic film 20 is positioned in a close or touching, backing relationship to phosphor anode 18, on the fiber-optic faceplate side of phosphor anode 18 that faces away from uranium cathode 16. Transmission line 10 is positively biased to about +30 volts by reverse bias 22, to deter electrons from crossing the gap from uranium cathode 16 to phosphor anode 18.

An electric field pulse 24 is launched along transmission line 10 by means of charge line 26 and Auston switch assembly 28. Charge line 26 is pulse-charged to a negative potential of about $-20$ kV by negative pulse bias voltage source 30. Voltage source 30 is of the hydrogen thyratron type, which is well known in the electronic art. Auston switches are also well known in the electronic art and are described in D. H. Auston, Appl. Phys. Lett. 26, 101 (1975); P. LeFur and D. H. Auston, Appl. Phys. Lett. 28, 21 (1976); and G. Mourou and W. Knox, Appl. Phys. Lett. 35, 492 (1979), all three of which are hereby incorporated by reference herein. An Auston switch is comprised of a semiconductor material, such as GaAs, that behaves as an insulator until it is illuminated with a high-energy laser pulse that turns it into a quasi-metal and renders it conducting through the very rapid creation of a great number of carriers. The formation of ohmic contacts on semiconductors such as GaAs is discussed by Piotrowska et al in Solid State Electronics 26, 179 (1983), and the alloying behavior of various films on GaAs is discussed by Ogawa in J. Appl. Phys. 51, 406 (1980), both of which documents are hereby incorporated by reference herein. Thus, a laser pulse 32 triggers Auston switch assembly 28. In the embodiment of the invention being described, laser pulse 32 is about 20 ps wide, and is comprised of 1.06 micron laser light.

When neutrons from a neutron source 34, which may be any neutron source, strike uranium cathode 16, electrons are produced by the fission process. In the usual mode of operation the energy of these electrons will be less than about 20 eV, consequently the voltage produced by reverse bias 22 will deter these electrons from crossing the intervening space between uranium cathode 16 and phosphor anode 18. However, if traveling electric field pulse 24 happens to be passing a location on uranium cathode 16 where electrons are being produced, then these electrons will be accelerated by the electric field of pulse 24 across the gap to phosphor anode 18 where they will produce a flash of light which will expose a spot on photographic film 20 that is backing phosphor anode 18. In the preferred embodiment of the invention being described, electric field pulse 24 has a duration of approximately 20 ps, and travels along transmission line 10 at approximately the speed of light. When it is developed, photographic film 20 will in general display a multiplicity of spots. It will be known that each spot was caused by a neutron that arrived at a location on uranium cathode 16 at the same time that electric field pulse 24 was passing that same location. All other neutrons striking uranium cathode 16, that are noncoincident with electric field pulse 24, will not record a spot on photographic film 20.

Figure 5:
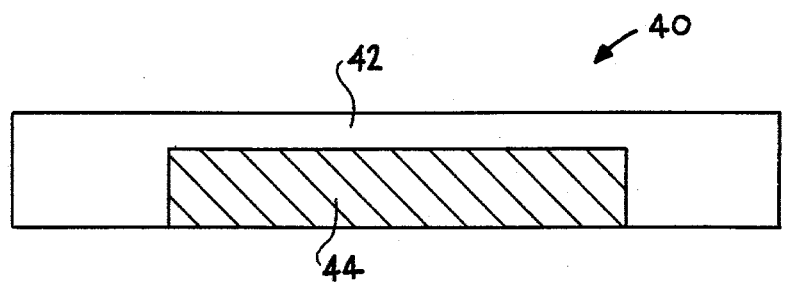
FIG. 5 is a top view of a possible experimental configuration of the photographic film used with a neutron detector made in accordance with the invention.

Attention is now directed to FIG. 5 which is a top view of an alternative photographic film configuration 40, for a neutron detector made in accordance with the invention. The strip of film is widened to include edge portion 42 that extends beyond its related phosphor anode, as well as active portion 44 that does extend over its related phosphor anode. Thus, when the photographic film is developed, edge portion 42 will yield a background measurement for the experiment since it should be completely unexposed by light caused by those neutrons which the detector is intended to measure.

Figure 2:
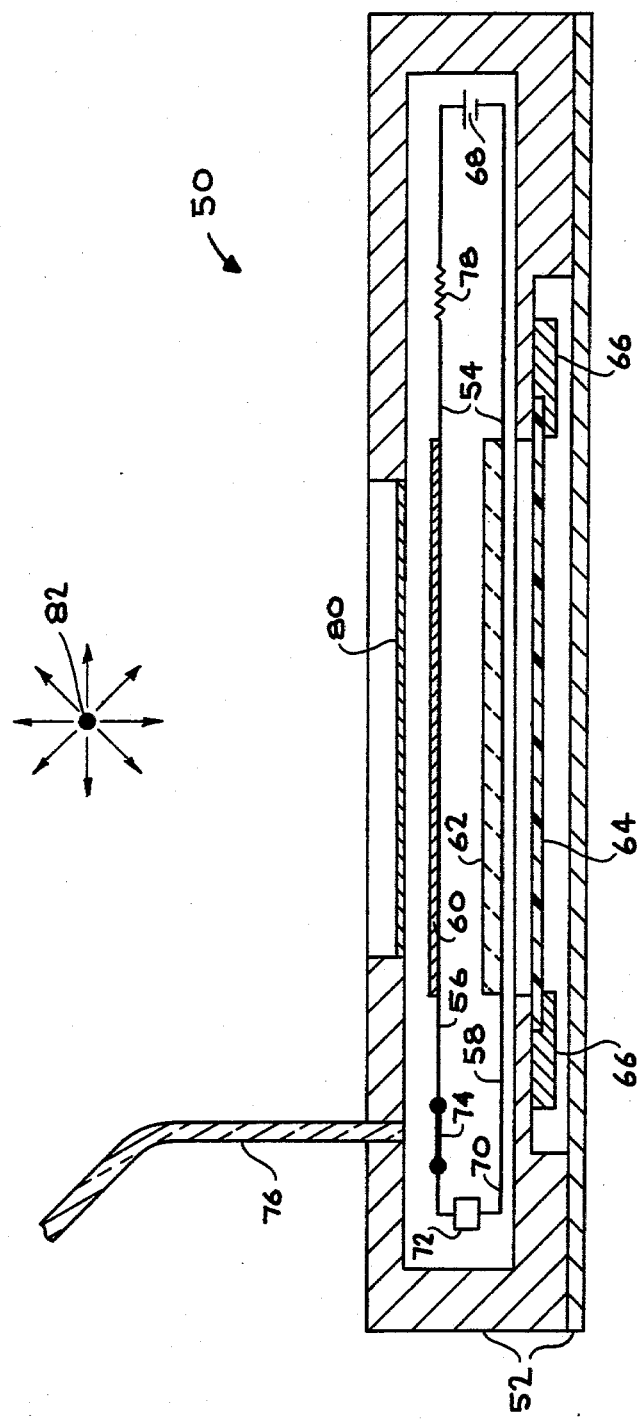
FIG. 2 is a schematic side view of a neutron detector made in accordance with the invention.

Reference is now made to FIG. 2, which is a schematic side view of a neutron detector 50 made in accordance with the invention, and which includes a transmission line portion generally as shown in FIG. 1. Detector 50 comprises an external housing 52, which must be evacuated. Generally, detector 50 comprises a transmission line 54, a first conductor 56, a second conductor 58, a uranium cathode 60, a phosphor anode 62, and a photographic film 64 held by a photographic film holder 66. A reverse bias for the detector is supplied by reverse bias input 68. Neutron detector 50 produces an electric field pulse, in the manner previously described, by means of a charge line 70 that is charged by a negative pulse voltage source 72, and an Auston switch assembly 74. The laser pulse that triggers Auston switch assembly 74 is introduced to detector 50 through fiberoptic cable 76. After the electric field pulse passes uranium cathode 60 it is absorbed in termination resistor 78. Termination resistor 78 is a large-area thick-film resistor that is long compared to the wavelength of significant frequencies in the electric field pulse. A window portion 80, of external housing 52, extending directly over uranium cathode 60 should be as thin as possible in order to minimize neutron scattering. It is preferred, for example, that window portion 80 comprise an approximately 25 micron thick sheet of stainless steel. Neutron detector 50 functions to measure neutrons emitted from neutron source 82 in the manner previously described in relation to the transmission line of FIG. 1.

Figure 3:
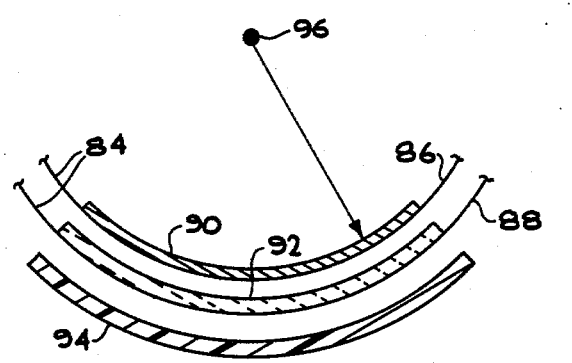
FIG. 3 is a schematic perspective view of a first experimental configuration of the transmission line portion of a neutron detector made in accordance with the invention.
Figure 4:
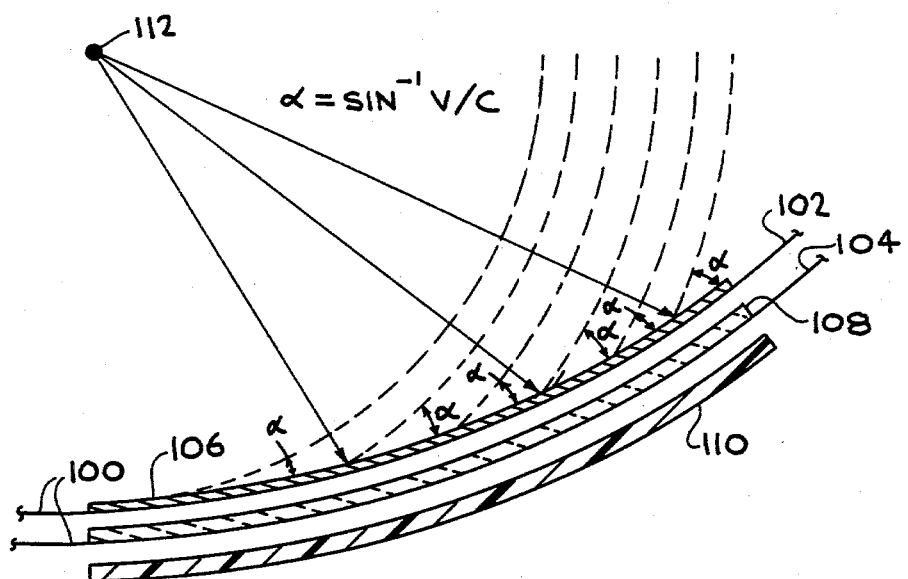
FIG. 4 is a schematic perspective view of a second experimental configuration of the transmission line portion of a neutron detector made in accordance with the invention.

The transmission line portions of neutron detectors made in accordance with this invention may be variously configured for different experimental purposes. As illustrations of this, reference is now made to FIGS. 3 and 4. In FIG. 3 a transmission line 84, comprising a first conductor 86 and a second conductor 88, is circularly curved so that a uranium cathode 90 and a phosphor anode 92 backed by a photographic film 94 are positioned to be approximately everywhere equidistant from a point neutron source 96. In this configuration, neutrons leaving source 96 at different times will be measured at different locations along transmission line 84. Alternatively, as shown in FIG. 4, a transmission line 100, comprising a first conductor 102 and a second conductor 104, is configured as a part of a logarithmic, or equiangular, spiral so that a uranium cathode 106 and a phosphor anode 108 backed by photographic film 110 are positioned to be at varying distances from a point neutron source 112. The terms logarithmic spiral and equiangular spiral are the equivalent commonly used names for that spiral determined by the mathematical equation $\ln \rho = a\theta$, wherein the natural logarithm of the radius vector polar coordinate is set equal to the product of a constant multiplied by the vectorial angle polar coordinate. Transmission line 100 is curved and positioned with respect to source 112 so as to, at every point, intersect with the circumference of a circle centered at source 112 at the limiting angle $\alpha$ where $\alpha$ equals $\sin^{-1} v/c$, as shown. In this expression, c is the velocity of light and v is the velocity of the neutrons being measured. In particular, for the frequently occurring situation where 14 MeV neutrons are being measured, v/c equals 0.17, and consequently $\alpha$ is approximately 10 degrees. In this geometry, only those neutrons leaving source 112 during essentially a single time window, and having the velocity v, will be measured at all locations along transmission line 100. The reason for this is that the electric field pulse travels between any two separated points along transmission line 100, at velocity c, in the same time that the neutrons travel the additional outward distance from source 112 to the second point, as compared to the distance to the first point, at velocity v. In this logarithmic, or equiangular, spiral configuration the total spot count along all of photographic film 100, when it is developed, will correspond to the neutron intensity of the source during the time window period. It is emphasized that the experimental transmission line configurations illustrated in FIGS. 3 and 4 are each particularly useful in situations where the neutrons being measured are substantially monoenergetic. This is precisely the situation that is frequently encountered in the diagnostics of 14 Mev neutrons.

It is thus appreciated that in accordance with the invention as herein described and shown in FIGS. 1 to 5, an efficient neutron detector of very high temporal resolution is provided, that may be used to measure distributions of neutrons produced by fusion reactions that persist for times as short as about 50 picoseconds.

Figure 6:
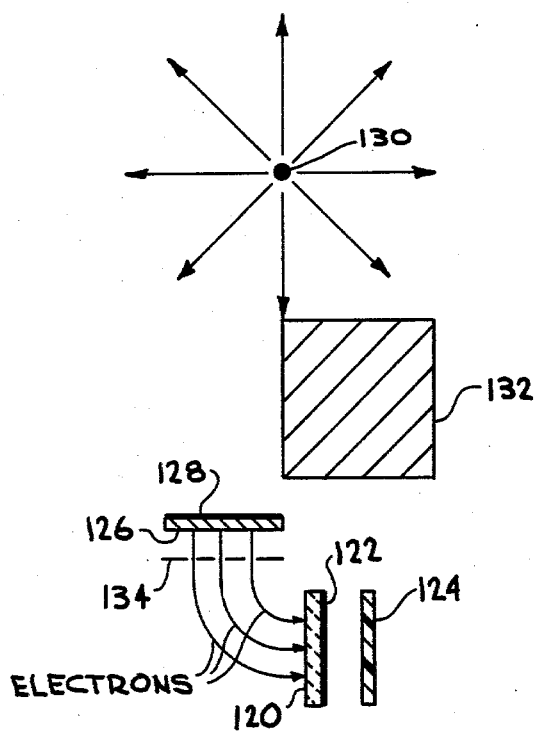
FIG. 6 is a scnematic front view of a shielded configuration of the transmission line portion of a neutron detector made in accordance with the invention.

The foregoing description of a preferred embodiment of the invention has been presented for purposes of illustration and description. It is not intended to be exhaustive or to limit the invention to the precise form disclosed, and obviously many modification and variations are possible in light of the above teaching. For example, in FIG. 6, to which attention is now directed, a schematic front view of a shielded configuration of the transmission line portion of a neutron detector made in accordance with the invention is shown. Here a phosphor anode 120, attached to a second conductor 122 of a transmission line and backed by a photographic film 124, is positioned perpendicularly to and away from a uranium cathode 126, attached to a first conductor 128 of the transmission line, as shown, so that photographic film 124 may be protected from direct radiation, as emitted from a neutron source 130, by a neutron shield 132. In this configuration it is necessary to add an additional mesh anode 134 to the transmission line. In the figure, electrons are shown by arrows.

The neutron detector embodiment herein disclosed was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A neutron detector, for measuring neutrons leaving a source that is approximately a point source, the detector comprising:

a circularly curved two-conductor traveling-wave transmission line, comprising a first conductor and a second conductor;

means for applying a reverse bias to the conductors of said transmission line;

means for launching an electric field pulse along said transmission line;

a circularly curved uranium cathode, comprising part of the first conductor of said transmission line, with said transmission line being circularly curved along the general locus of said uranium cathode, and with said uranium cathode being adapted to be positioned everywhere approximately equidistant from said source;

a circularly curved phosphor anode, comprising part of the second conductor of said transmission line, with said cathode and said anode adjacently disposed, so that when a neutron from said source strikes said uranium cathode at the same time that said electric field pulse is passing thereby, electrons ejected from said uranium cathode are caused by said field to strike said phosphor anode and produce light, and so that neutrons that leave said source at different times are measured at different locations along said transmission line; and means for recording the light produced by said ejected electrons striking said phosphor anode.

2. A neutron detector, for measuring neutrons leaving a source that is approximately a point source, the detector comprising:

a two-conductor traveling-wave transmission line configured as part of a logarithmic, or equiangular spiral, with said transmission line comprising a first conductor and a second conductor;

means for applying a reverse bias to the conductors of said transmission line;

means for launching an electric field pulse along said transmission line;

a uranium cathode configured as part of said logarithmic, or equiangular spiral, and comprising part of the first conductor of said transmission line, with said transmission line being configured as said logarithmic, or equiangular spiral along the general locus of said uranium cathode, and with said uranium cathode being adapted to be positioned with respect to said source so that at every point along said locus said spiral intersects with the circumference of a circle centered at said point source at a limiting angle equal to the arc sine of the quotient of the velocity of light divided by the velocity of the neutrons being measured;

a phosphor anode configured as part of said logarithmic, or equiangular spiral, and comprising part of the second conductor of said transmission line, with said cathode and said anode adjacently disposed, so that when a neutron from said source strikes said uranium cathode at the same time that said electric field pulse is passing thereby, electrons ejected from said uranium cathode are caused by said field to strike said phosphor anode and produce light, and so that neutrons that leave said source at a single time are measured at all locations along said transmission line; and means for recording the light produced by said ejected electrons striking said phosphor anode.

* * * * *